Feb. 17, 1970  R. L. AVERY ET AL  3,495,867
WORK HOLDER
Filed June 26, 1967  3 Sheets-Sheet 1
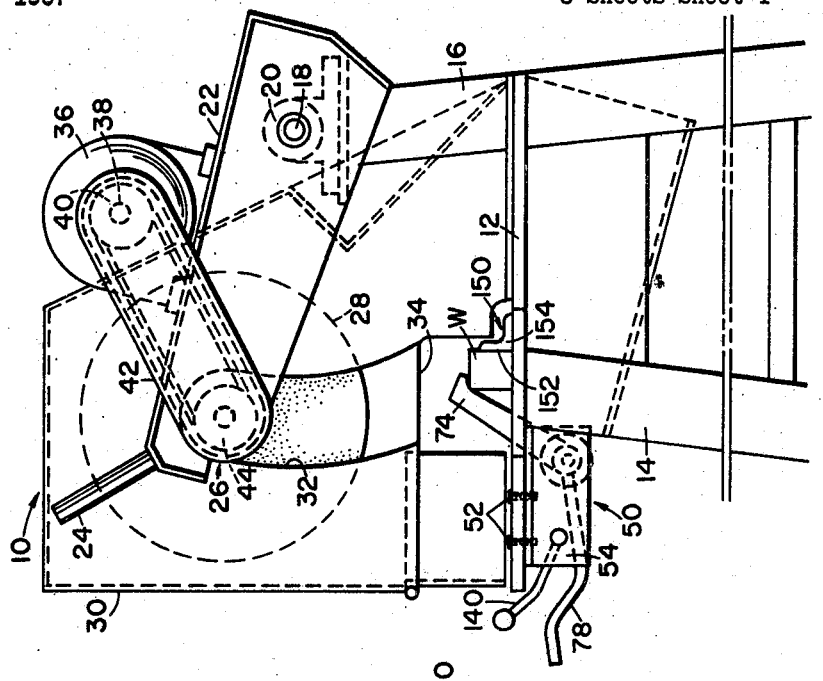
INVENTORS
RALPH L. AVERY
PETER C. DOOLEY
BY
K. W. Brunell Feb. 17, 1970 R. L. AVERY ET AL 3,495,867
WORK HOLDER
Filed June 26, 1967 3 Sheets-Sheet 2

INVENTORS
RALPH L. AVERY
PETER C. DOOLEY
BY
K.W. Brownell

Feb. 17, 1970    R. L. AVERY ET AL    3,495,867
WORK HOLDER
Filed June 26, 1967    3 Sheets-Sheet 3

INVENTORS
RALPH L. AVERY
PETER C. DOOLEY
BY
K.W. Brownell

United States Patent Office 3,495,867
Patented Feb. 17, 1970

3,495,867
WORK HOLDER
Ralph L. Avery, Buffalo, and Peter C. Dooley, Jr., Lewiston, N.Y., assignors to The Carborundum Company, Niagara Falls, N.Y., a corporation of Delaware
Filed June 26, 1967, Ser. No. 648,675
Int. Cl. B25b 1/06
U.S. Cl. 269—221                                    6 Claims

ABSTRACT OF THE DISCLOSURE

A work holder comprising a pair of work engaging clamping members mounted on a rotatable shaft. A drum is mounted on the shaft and is substantially encircled by a strap. The shaft is rotated to first bring the clamping members into engagement with a workpiece. Thereafter, the strap is drawn and tensioned about the drum to rotate the same and further rotate the shaft a limited amount to apply pressure to the clamping members against a workpiece.

---

This invention relates to a work holder, and more particularly, to a means for exerting a clamping force on workpieces to maintain them in position while a machine operation is being performed thereon. Although the present invention may be used in connection with tools of various types, it will be convenient to refer to its use specifically in clamping metal workpieces on a cut-off machine.

In machining operations it is quite important that a workpiece be accurately positioned and held with respect to a tool while such tool performs a machining operation on the workpieces, such as cutting or grinding for example. Quite often work holding fixtures may be devoted exclusively for clamping workpieces of a particular shape and design. For example, some work holders are adapted to accommodate different sizes of round stock, while others have been devised for angular pieces, and still others have been designed for the clamping of other specific shapes. Considerable production time may be lost in changing the work holder fixtures to accommodate a large variety of pieces of different sizes and shapes.

The general purpose of the present invention is to provide a solution to the above problem by employing a work holder for accommodating various sizes and shapes of pieces and for mechanically furnishing the required pressure to maintain a workpiece in place.

It is therefore an object of the present invention to provide a new and improved work holder.

It is another object of the present invention to provide a new and improved work holder which is compact, simple and strong in its construction, rapid and efficient in its operation, and rugged and durable in use.

It is a further object of the present invention to provide a new and improved work holder having a strap wrench mechanism for applying a tremendous pressure to the workpiece.

These and other objects of the present invention will become more apparent upon consideration of the following detailed description thereof when taken in conjunction with the following drawings, in which:

FIG. 1 is a front elevational view of a cut-off machine in which a preferred illustrative embodiment of the invention is incorporated;

FIG. 2 is a side elevational view of the cut-off machine of FIG. 1;

Figure 3:
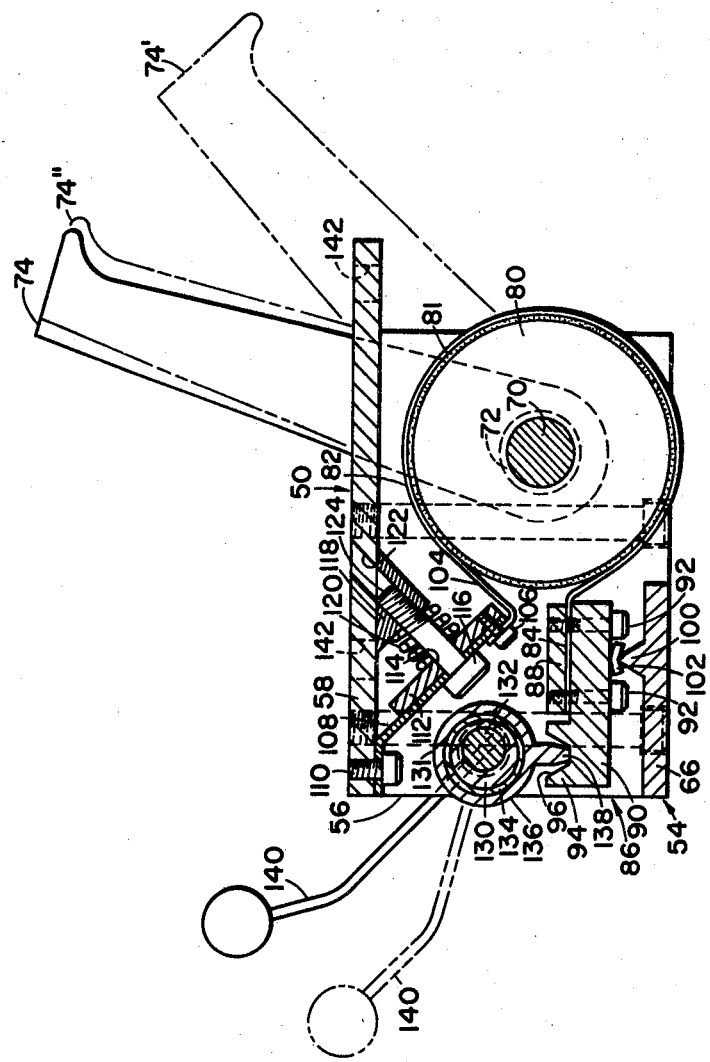
FIG. 3 is an enlarged longitudinal section of the work holder taken on the plane of line 3—3 of FIG. 4 and constructed in accordance with the principles of this invention.

Referring now to these drawings in detail, it will be seen that a preferred embodiment of the invention is, by way of illustration, incorporated in a cut-off machine, generally designated 10, having a worktable 12, with a work supporting surface thereon, suitably supported on a base 14. Extending upwardly from worktable 12 is a standard 16 having a pivotable shaft 18 suitably journaled in a bearing block 20. An arm 22 is mounted adjacent one end thereof on shaft 18 for swinging movement therewith and is provided with a handle 24 adjacent the opposite end of said arm. Suitably mounted adjacent the end of arm 22 remote from shaft 18 is a vibrating spindle, assembly, generally designated 26, for supporting a cut-off wheel 28 for rotary movement therewith.

Mounted on worktable 12 is a guard 30 adjacent cut-off wheel 28 for confining flying debris resulting from the cutting operation. An arcuate upwardly extending slot 32 is provided in one side of the guard 30 for receiving spindle assembly 26 and permitting the raising or lowering thereof upon swinging movement of arm 22 about the axis of shaft 18. The guard is also provided with openings 34 on both sides of the guard adjacent worktable 12 to accommodate the passage of workpieces W therethrough.

Suitably supported on arm 22 is an electric motor 36 having a power shaft 38 to which is rigidly secured a drive pulley 40. An endless drive belt 42 is trained about drive pulley 40 and a pulley 44 suitably connected to the spindle assembly 26 for rotating the same.

A work holder, generally designated 50, is suitably secured to the underside of worktable 12 by means of suitable screws 52.

Figure 4:
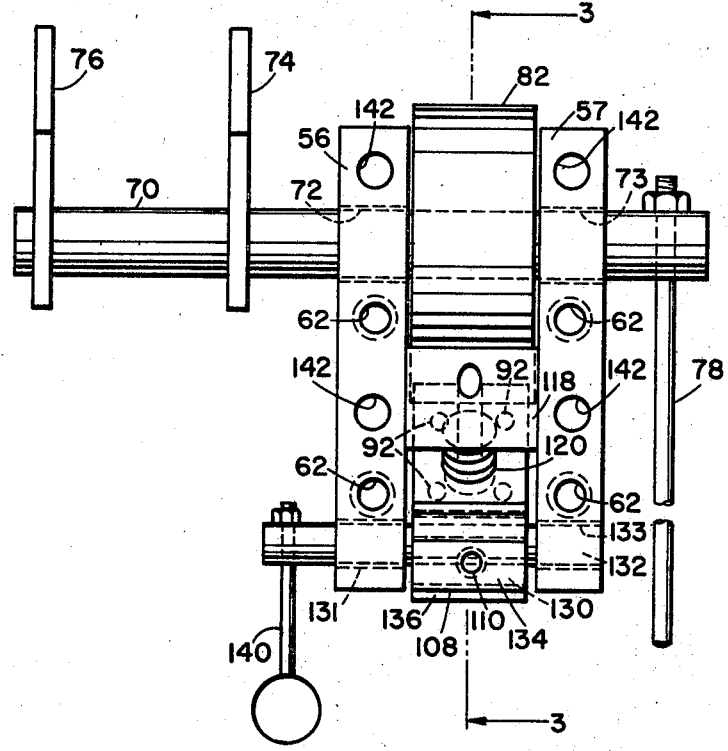
FIG. 4 is a top plan view of the work holder shown in FIG. 3 with the top cover removed.
Figure 5:
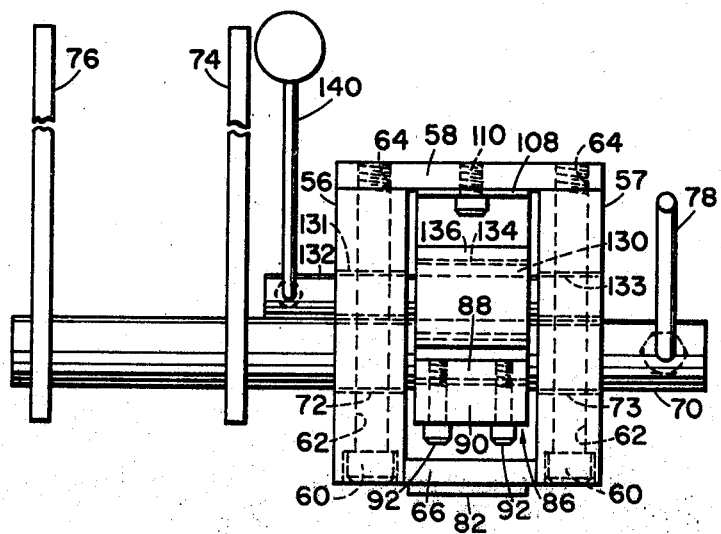
FIG. 5 is a side elevational view of the work holder shown in FIG. 3.

Referring now to FIGS. 3, 4 and 5 of the drawings, it will be seen that the work holder 50 comprises a housing, generally indicated 54, having a pair of side walls 56 and 57 and a top cover 58. Suitable bolts 60 are directed through bores 62 in the side walls 56 and 57 and extend to threaded bores 64 of the top cover 58. For purposes of convenience of description, the top cover has been removed in FIG. 4. It will also be seen that a portion of the bottom of the housing is closed by means of a bottom cover 66 while the remainder of the housing is opened.

A shaft 70 extends across the housing 54 and protrudes beyond both side walls 56 and 57, respectively. Shaft 70 is rotatably journaled in suitable Teflon® bushings 72 and 73 disposed in side walls 56 and 57, respectively. Suitably rigidly secured to one side of shaft 70 exteriorly of the housing is a pair of spaced work clamping members or fingers 74 and 76. A handle 78 is suitably connected to the other end of shaft 70 for rotating the shaft and thereby actuating clamping fingers 74 and 76 and bringing them into engagement with the workpiece W. Also secured to shaft 70 and rotatable therewith is a cylindrical drum 80. An abrasive granular material 81 is deposited around the periphery of drum 80 for a puropse hereinafter explained.

A metallic strap 82, preferably made of steel, is mounted about the periphery of drum 80 and has one end 84 mounted on a pivotable block assembly, generally designated 86. The block assembly 86 comprises a pair of plates 88 and 90 which sandwich the end 84 of strap 82 therebetween, the entire assembly being secured together by four bolts 92 inserted through plate 90 and threadably received in plate 88. Although preferably four bolts are used, the principles of this invention envisage any suitable number of bolts, as desired. One end of plate 90 is provided with a vertical extension 94 having a cupped portion or cavity 96 for a purpose hereinafter more fully explained.

Cover 66 is provided with a vertical triangular extension 100 having its apex in engagement with the underside of and at the midpoint of an angular member 102, which in turn has its topside in engagement with the bottom of the pivotable block assembly 86. Thus, it will be seen that the block assembly may be rocked about the midpoint of member 102 which serves as a fulcrum point. The terms underside, topside, bottom, upper, lower and the like as used herein are referenced to FIG. 3 and are applied only for convenience of description and should not be taken as limiting the scope of this invention.

The other end 104 of strap 82 is rigidly secured, as by means of a screw 106, onto one end of an angular plate 108 in turn secured at its other end to top cover 58 by screw 110. Screw 106 also secures a spring abutment member 112 to plate 108. Spring abutment member 112 is provided with an opening 114 for receiving a bolt 116 which is threadedly secured into a second spring abutment 118 rigidly secured to the inner side of top cover 58 as by means of welding for example. A spring 120 is disposed about bolt 116 between spring abutment members 112 and 118 for effecting the desired tension on strap 82. An inclined opening 122 is provided in top cover 58 for providing access to a slot 124 cut in the threaded end portion of bolt 116 for permitting adjustment of the tension spring 120 and thereby the tension on strap 82.

Means are provided for pivoting the block assembly 86 about its fulcrum point to pull strap 82 about drum 80. These means comprise an eccentric 130 suitably secured on shaft 132 which extends across the housing 54 and protrudes beyond side wall 56. Shaft 132 is rotatably journaled in suitable Teflon® bushings 131 and 133 disposed in side walls 56 and 57, respectively. A sleeve 134 is rigidly secured about eccentric 130 and a cylindrical hollow collar 136 is rigidly secured onto the sleeve 134, said collar 136 having a projection 138 extending from the periphery thereof and integral therewith. Projection 138 is disposed in the cavity 96 of pivotable block 86 and the end of the projection engages the deepest portion of said cavity 96. A handle 140 is provided adjacent the end of shaft 136 for rotating the same.

It will be seen that a plurality of threaded bores 142 are provided in top cover 58 for the purpose of receiving the bolts or screws 52 which are inserted through the worktable 12. Also, a pair of spaced elongated slots 144 and 146 are provided in the worktable 12 to accommodate clamping fingers 74 and 76, respectively, which are the only elements of the work holder protruding through and above the worktable 12. A third slot 148 is disposed between slots 144 and 146 for receiving the cut-off wheel 28. Housing 54 is so mounted beneath worktable 12 that clamping fingers 74 and 76 are located in vertical planes disposed on either side of the vertical plane of cut-off wheel 28.

An elongated angular member, generally indicated as 150, having a vertical work abutment 152 and a horizontal leg 154 releasably secured to worktable 12 by suitable bolts is provided with a slot 156 for allowing the cut-off wheel 28 to pass therethrough.

The general mode of operation of the improved work holder above described is as follows: A workpiece W of any design or shape is placed on the worktable 12 against the vertical work abutment 152 and is positioned lengthwise on the table so as to obtain the cut at the desired point on the workpiece. Handle 78 is raised to bring the clamping fingers 74 and 76 into engagement with the workpiece W. FIG. 3 shows one position of the clamping fingers at 74 and another position indicated at 74' to illustrate the capability of the device to handle workpieces of varying sizes. Thereafter, handle 140 is swung downwardly causing rotation of shaft 132 and its associated eccentric 130 to effect a downward arcuate movement of projection 132 which in turn engages the cavity 96 of block assembly 86 and pivots the same in a counterclockwise direction (as seen in FIG. 3) about the fulcrum point defined by the mid-point of member 102 to raise the right-hand end of block assembly 86. Strap 82 is thus tensioned about the drum 80. The drum 80 will rotate slightly due to the friction between the strap 82 and the gripping abrasive surface of drum 80 to cause rotation of shaft 70 and thereby further move clamping fingers 74 and 76 to the position indicated in phantom at 74'' (FIG. 3) to wedge the workpiece W against vertical abutment member 152. The holding power of the clamping action established in this manner has been found to be more than satisfactory in practice. By way of illustration, it has been found that the force ratio is at least 10 to 1, i.e. for every pound of force applied to handle 140, at least ten pounds of force are exerted against the workpiece. As hereinbefore mentioned, the tension on strap 82 may be controlled by adjusting the tension on spring 120 by means of bolt 116. The bolt 116 determines the clearance between drum 80 and strap 82 for influencing the amount of effort required to depress handle 140.

Although the invention has been illustrated as being applied to a cut-off machine, it will be evident that its utility is not restricted thereto. It may be applied to advantage in various machine tools such as drilling machines, shaping machines, grinding machines, etc., or it may be embodied in a portable clamp structure, such as a pipe vise for example.

As a result of the present invention, a new and improved work holder is provided for exerting a clamping force on workpieces to maintain them in the desired position in an improved and more efficient manner. By the provision of a unique strap wrench mechanism, tremendous pressure is applied to the workpiece to hold the same very securely and tightly. Another advantage of the work holder of the present invention is its ability to handle a wide variety of sizes and shapes. A further advantage of the apparatus of the present invention is that only two relatively thin clamping fingers protrude above the worktable during a machining operation without the necessity of other cumbersome elements. Still another advantage of the apparatus of the present invention is that when the clamping fingers are in their inactive positions, they offer no obstructions that might interfere with the positioning of workpieces upon the worktable of the machine.

A preferred embodiment of the principles of this invention having been hereinbefore described and illustrated, it is to be realized that modifications thereof can be made without departing from the broad spirit and scope of this invention as defined in the appended claims.

We claim:

1. A work holder comprising: a housing; a rotatable shaft mounted in said housing and extending outwardly therefrom; a pair of spaced clamping members mounted on said shaft adjacent one end thereof exteriorly of said housing; said clamping members engageable with a workpiece; first means for moving said clamping members into engagement with said workpiece; and second means for applying pressure to said clamping members against said workpiece.

2. A work holder comprising: a housing; a rotatable shaft mounted in said housing and extending outwardly therefrom; a pair of spaced clamping members mounted on and adjacent one end of said shaft exteriorly of said housing; said clamping members engageable with a workpiece; first means for moving said clamping members into engagement with said workpiece under a relatively low pressure; and second means for applying a pressure greater than said low pressure to said clamping members against said workpiece, 3. A work holder as defined in claim 2 in which said second means comprises a drum mounted on said shaft within said housing; a block pivotably supported in said housing; and a strap partially encircling said drum having one end secured to said housing and the other end secured to said pivotable block.

4. A work holder as defined in claim 3 in which friction means are disposed between said drum and said strap.

5. A work holder as defined in claim 4 including a second rotatable shaft mounted in said housing and extending outwardly therefrom; and eccentric means mounted on said rotatable shaft for pivoting said block to tension said strap about said drum and rotate the same.

6. A work holder as defined in claim 5 including a handle carried by said second rotatable shaft exteriorly of said housing.

References Cited

UNITED STATES PATENTS

| | | | |
|---|---|---|---|
| 1,022,363 | 5/1912 | Harrison | 269—32 |
| 2,647,483 | 8/1953 | Price | 269—244 X |
| 2,967,464 | 1/1961 | Marmillon | 269—30 |

FOREIGN PATENTS 226,168   1963   Austria.

OTHELL M. SIMPSON, Primary Examiner

D. R. MELTON, Assistant Examiner

U.S. Cl. X.R.

269—135, 237